Feb. 18, 1969   J. M. J. DESMOULINS   3,428,039
FOLDING OVEN FOR PORTABLE STOVE
Filed Nov. 29, 1966   Sheet 1 of 2

United States Patent Office 3,428,039
Patented Feb. 18, 1969

3,428,039
FOLDING OVEN FOR PORTABLE STOVE
Jean Marie Joseph Desmoulins, 15 rue de la Reine Hortense, St.-Leu-la-Foret, France, and Jean Marie P Becker, 14 Quai du Loing, St.-Mammes, France,
Filed Nov. 29, 1966, Ser. No. 597,595
U.S. Cl. 126—9                                    6 Claims
Int. Cl. F24c 1/16, 5/20; F24h 7/00

ABSTRACT OF THE DISCLOSURE

This invention is concerned with an arrangement for portable stoves, more particularly for a camping stove, comprising a folding wind-guard made of removable plates and a part of which forms a compartment enclosing at least one burner of the stove and provided with a cover plate and with a hinged front plate forming a door so as to form a folding oven.

---

This invention relates to collapsible or folding ovens and has specific reference to a device of this character intended for use with a small portable stove, more particularly a camping stove.

Heating apparatus for culinary use, specially designed for open air service are multifarious but none of the hitherto known, apparatus of this type permit of cooking meals under the convenient conditions offered by household kitchen cooking stoves; in fact, all these kitchen stoves are equipped with an oven heated from the top and from the bottom, frequently adapted to receive a mechanical or electrical rotary spit and comprising a horizontal, vertically-adjustable sheet-metal tray so that the dishes can be cooked from beneath when the tray is in its lowermost position whereafter the culinary preparation is glazed or browned by transferring this tray to a higher position at the end of the cooking period.

It is a primary object of this invention to provide a folding oven adaptable to a portable stove and comprising all the advantageous features and practical possibilities of fixed kitchen stoves mentioned in the preceding paragraph. In its folded condition the oven of this invention is extremely flat and light in weight; it enables persons desirous to enjoy open-air leisures to prepare outdoor the same meals as at home.

It is another object of this invention to provide a folding support for a portable stove having in its folded condition the appearance and dimensions of a suitcase or portmanteau, this support comprising hinged and/or detachable plates adapted in their unfolded or spread position to surround completely at least one of the burners of the stove while acting as draught-screens, and further comprising means for constituting an enclosure suitable for use as a cooking oven.

The advantages and specific features of this invention will appear as the following description proceeds with reference to the attached drawing, in which.

Figure 1:
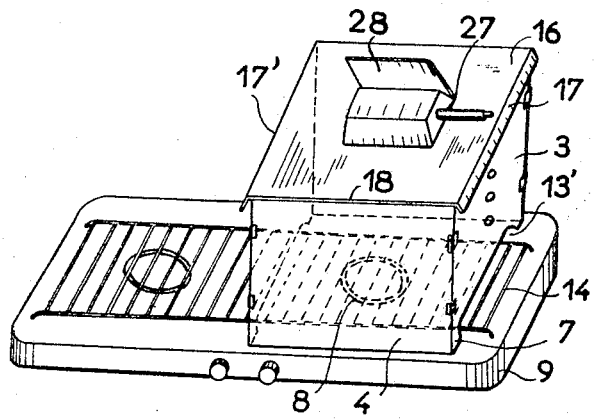
FIGURE 1 is a perspective view showing a portable stove equipped with the folding oven constituting the subject-matter of this invention.
Figure 2:
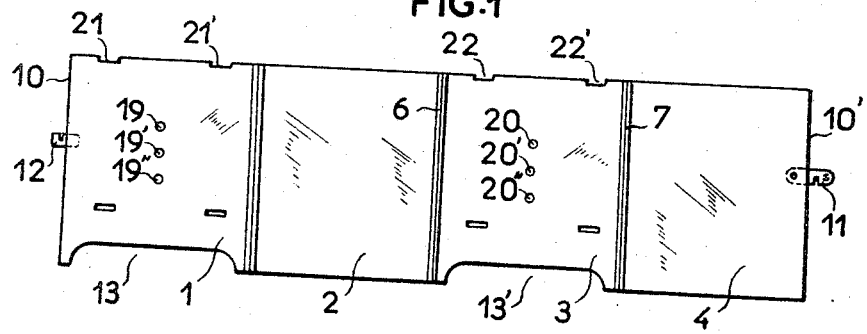
FIGURE 2 is a side elevational view showing the four hingedly interconnected plates in their unfolded position.

In a first form of embodiment of this invention, as illustrated in FIGURES 1 to 5 of the drawing, the folding oven consists essentially of four plates 1, 2, 3 and 4 hingedly interconnected by means of hinges 5, 6 and 7 and made from any suitable material, for example relatively thin sheet metal. In the operative position shown in FIGURE 1 the four plates 1 to 4 constitute the four lateral vertical walls of a cube surrounding the burner 8 of a portable stove 9 supporting said four plates; the two free ends 10 and 10' respectively of the end plates 1 and 4 which are assembled in the operative position are secured and fastened for example by means of a latch 11 engageable in a notch formed on a corresponding keeper 12.

The four walls of the folding oven according to this invention are adapted to be locked in their proper relative angular positions by means of one or several corner sections 15 (FIGURE 3) straddling each upper corner formed by any pair of adjacent plates. The opposite plates 1 and 3 corresponding to the lateral walls of the oven are notched along their lower edge at 13 and 13' to avoid any interference with the pan-supporting grid 14 of stove 9.

The four vertical plates constituting the oven walls are capped by a cover 16 consisting of a flat plate formed at least along two opposite edges with bent marginal portions 17 and 17', for holding the cover 16 against motion on the four vertical plates. Preferably, these marginal portions 17 and 17' are provided along three sides of the cover, the fourth side 18 corresponding to the front of the oven being free to facilitate the movements of the front plate 4 about its hinge means 7, this plate 4 constituting the door of the oven and permitting a convenient supervision of the cooking in progress.

The opposite plates 1 and 3 are also provided with perforations 19, 19' and 19'', and 20, 20', 20'', adapted to receive and support the ends of a spit.

The relative spacing between two adjacent holes will preferably be the same as in the most popular makes of mechanical or electrical rotary spits, between the spit rod and the motor fastening stud. Thus, with only three holes it will be possible to set the spit at three different levels while locking the spit driving motor during the rotation of the piece of meat being cooked.

The same opposite plates 1 and 3 also comprise each along their upper edge, a pair of small notches 21, 21' and 22, 22' adapted to lock in proper position the upper bent portion 23 of a rack 25 formed with notches 26, 26' and 26'' for supporting a lower tray (not shown) for carrying the dishes to be cooked.

The oven cover 16 comprises preferably in its central portion an opening 27 of any suitable shape preferably rectangular, provided with a hinged shutter 28 adapted to close this opening 27; the purpose of this opening 27 is to enable the user to supervise the cooking in progress without having to open the front door of the oven consisting of the aforesaid plate 4; if desired, an additional source of heat may be adapted to this opening for cooking means from the top of the oven.

To this end, a suitable bent, hinge-forming element 29 is welded or otherwise secured along one edge of said opening 27, this element 29 having for example a concave face turned towards the plate 16 and engageable by a corresponding bent marginal portion 30 of the auxiliary source of heat 31; as this source of heat is retained by its edge 30, it will constantly be prevented from tipping over under the weight of the burner 32; a heating plate 33, for example of suitable refractory earth, exposed to the heat produced by the burner 32, is fitted over the opening 27.

Figure 6:
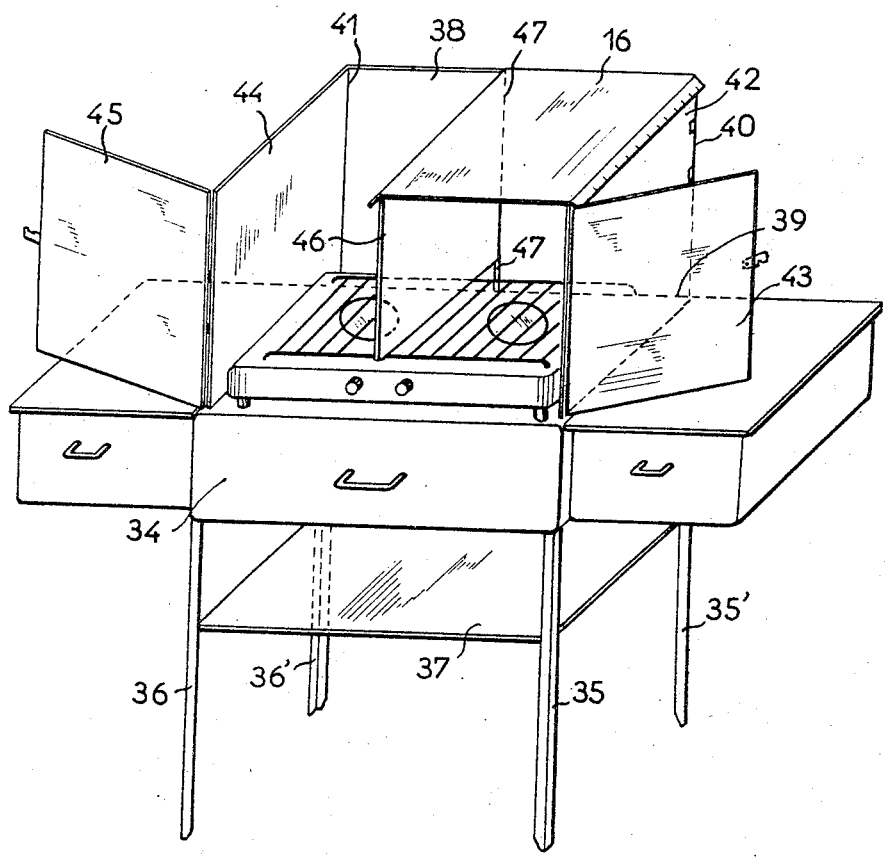
FIGURE 6 is a perspective view showing a folding support for a portable oven comprising movable plates adapted to constitute a cooking oven.

According to another, alternate form of embodiment of the present invention which is illustrated in FIGURE 6, the oven is adapted to a folding or collapsible support for portable or camping stove, said support having substantially the appearance and dimensions of a suitcase or portmanteau in its folded condition.

The support proper consists in the known manner of a preferably metallic inverted box 34 carried by four detachable legs 35, 35' and 36, 36' locked in their operative position by a lower tray 37 constituting a supporting shelf in its service position and adapted on the other hand to constitute a cover for closing the box 34; finally, this box 34 also comprises the above-described hingedly interconnected plates acting as draught-screens.

The rear plate 38 is hinged to the lateral longitudinal edge 39 of support 34 and in its folded position it engages the upper face of box 34. Each vertical edge 40 and 41 of this rear plate 38 has hingedly attached thereto a double hinged plate 42 and 43 on the one hand and 44, 45 on the other hand; in the service position all the plates 38, 42, 43, 44 and 45 surround four sides of the stove 9 carried by the box-shaped support 34 and thus protect from undesired draughts the flames or the source of heat.

According to this invention, the folding oven consists of plates 42 and 43 constituting respectively the right-hand lateral wall and the front vertical wall of the oven, as seen in FIGURE 6. The right-hand half of the rear plate 38 constitutes the vertical back wall of the oven; a detachable plate 46 constitutes the left-hand wall of the oven; it has formed along its lower edge a notch to avoid any interference with the grid covering the burners; the rear wall 38 further comprises in its middle a vertical slot or rib 47 engageable by the rear edge of plate 46 to hold same in the proper vertical position.

Figure 4:
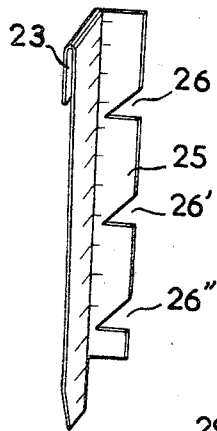
FIGURE 4 is a perspective view of a detachable rack adaptable to the walls of the oven of this invention.
Figure 3:
FIGURE 3 is a perspective view of a corner section for securing the oven in position.
Figure 5:
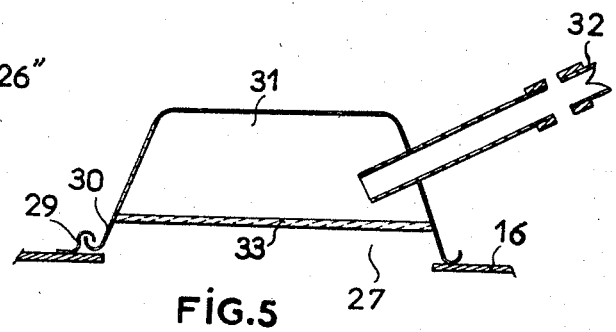
FIGURE 5 is a sectional view showing a burner adaptable to the upper portion of the oven.

As already described hereinabove, the plate 43 constituting the door of the oven of this invention comprises a latch engageable in the corresponding keeper secured to plate 46; besides, the opposite lateral walls 46 and 43 are provided with perforations disposed at different levels for receiving the rod of a rotary spit; finally, four racks shown in FIGURE 4 are also disposed on the walls 46 and 43 and supported by adequate notches formed in the upper edge of these walls, the function of these racks consisting in supporting at the desired and convenient level the lower heating tray carrying the dish containing the meal to be cooked.

A cover forming-plate 16 is fitted on the top of the oven and comprises to this end three slightly bent marginal portions to keep the cover in its proper position, the front edge of this cover being free and unbent to permit the opening of the front, door-forming plate 43.

The various component elements of the simplified oven according to this invention are so designed that in their folded condition they constitute a compact, unitary structure with the apparatus on which they are normally utilized.

Thus for example, in the case of folding supports of camping stoves which have the appearance and size of a portmanteau in their folded condition, the two plates of the folding oven, the inner plate of the oven, the four racks and the auxiliary heating means provided at the top of the oven would have such dimensions that they would fit completely within the box-shaped stove.

What is claimed is:

1. In combination with a portable stove having a plurality of burners, an arrangement comprising a plurality of removable plates provided with means for vertically positioning same on said stove and with means for interconnecting the adjacent edges of said plates which comprise at least one rear plate extending along the whole length of the stove and two lateral plates to form a windguard for the said burners, an intermediate transverse plate forming with on of said lateral plates a compartment enclosing at least one of said burners, a front plate hingedly secured to the forward edge of said lateral plate to form a door for said compartment, locking means being provided on the free vertical edge of said door plate and on the forward edge of the intermediate transverse plate, and a removable cover plate provided with means for positioning same on the upper edges of said lateral plate and said intermediate plate to form a folding oven heated by the burner therein enclosed.

2. In an arrangement according to claim 1, an inner tray adapted to be positioned inside the folding oven, two pairs of rod like racks having notches adapted to be engaged by and to support the lateral edges of said tray, and provided at their upper ends with an inverted U bent portion adapted to engage the upper edge of the lateral plate and the intermediate plate forming the opposite walls of the folding oven respectively.

3. In an arrangement according to claim 1, perforations provided in said lateral and said intermediate plate forming the opposite walls of the folding oven, a rotary spit having a rod adapted to rotatably engage said perforations and to be carried thereby.

4. In an arrangement according to claim 7, means for locking the said lateral and intermediate plates in a suitable angular position with respect to the rear plate, said means comprising corner sections adapted to engage the upper edges of said plates, whereas the means for positioning the cover plate comprise bent marginal portions along the lateral edges thereof to engage the upper edges of the said lateral and intermediate plates forming the opposite walls of the folding oven.

5. In an arrangement according to claim 1, a rectangular opening provided in the central part of the cover plate, a heating element adapted to be secured to the edges of said opening, said element comprising a housing having at the bottom thereof an opening registering with the opening of the cover plate, a radiating plate arranged in said housing near its bottom, and a burner extending into said housing between said radiating plate and the top of the housing.

6. In an arrangement according to claim 1, a vertical slot provided in the rear plate to receive and hold the vertical rear edge of the intermediate vertical plate forming one of the walls of the folding oven.

References Cited

UNITED STATES PATENTS

| | | | |
|---|---|---|---|
| 878,862 | 2/1908 | Boughton | 126—9 |
| 1,050,407 | 1/1913 | Verrette | 229—49 |
| 1,264,493 | 4/1918 | Denney | 126—38 |
| 1,396,059 | 11/1921 | Reppetto | 126—275 |
| 1,428,867 | 9/1922 | Taylor | 126—275 |
| 1,686,620 | 10/1928 | Lindemann et al. | 126—38 |
| 2,832,331 | 4/1958 | Schwank | 126—40 X |

FREDERICK KETTERER, *Primary Examiner.*

U.S. Cl. X.R.

126—375, 38